United States Patent
Li et al.

(10) Patent No.: US 9,154,579 B2
(45) Date of Patent: Oct. 6, 2015

(54) METHOD, SERVICE BOARD, AND SYSTEM FOR TRANSMITTING KVM DATA

(75) Inventors: Yansong Li, Shenzhen (CN); Fan Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 234 days.

(21) Appl. No.: 13/465,455

(22) Filed: May 7, 2012

(65) Prior Publication Data

US 2012/0297098 A1  Nov. 22, 2012

Related U.S. Application Data

(63) Continuation of application No. PCT/CN2011/074177, filed on May 17, 2011.

(51) Int. Cl.
*G06F 13/12* (2006.01)
*H04L 29/06* (2006.01)
*G06F 3/14* (2006.01)

(52) U.S. Cl.
CPC .............. *H04L 67/38* (2013.01); *G06F 3/1454* (2013.01); *G09G 2330/08* (2013.01); *G09G 2370/12* (2013.01); *G09G 2370/24* (2013.01)

(58) Field of Classification Search
CPC ............. G06F 3/1454; G09G 2370/24; G09G 2370/12
USPC .......................................................... 710/57
See application file for complete search history.

(56) References Cited

U.S. PATENT DOCUMENTS

| | | | |
|---|---|---|---|
| 5,453,978 A * | 9/1995 | Sethu et al. | 370/254 |
| 6,157,650 A * | 12/2000 | Okuyama et al. | 370/401 |
| 2002/0124128 A1 | 9/2002 | Qiu | |
| 2007/0206630 A1* | 9/2007 | Bird | 370/465 |
| 2008/0126597 A1* | 5/2008 | Hirai | 710/19 |
| 2009/0168659 A1* | 7/2009 | Matityahu et al. | 370/252 |
| 2009/0172222 A1* | 7/2009 | Katayama et al. | 710/72 |
| 2009/0290501 A1* | 11/2009 | Levy et al. | 370/250 |
| 2010/0303068 A1* | 12/2010 | Glaros et al. | 370/389 |
| 2011/0055844 A1 | 3/2011 | Nguyen et al. | |

FOREIGN PATENT DOCUMENTS

| | | |
|---|---|---|
| CN | 1503946 A | 6/2004 |
| CN | 1983975 A | 6/2007 |
| CN | 101132301 A | 2/2008 |
| CN | 101227329 A | 7/2008 |
| CN | 102047514 A | 5/2011 |

(Continued)

OTHER PUBLICATIONS

Supplementary European Search Report dated Apr. 23, 2013 in connection with European Patent Application No. EP 11 76 8465.

(Continued)

*Primary Examiner* — Henry Tsai
*Assistant Examiner* — John Roche

(57) ABSTRACT

A method for transmitting keyboard, video, mouse (KVM) data includes converting, by a service board, KVM data into a KVM packet; sending the KVM packet to a switch board through a BASE channel, so that the switch board forwards the KVM packet to a remote console. The embodiments of the present invention are mainly applied to a process for implementing KVM data transmission based on ATCA architecture.

15 Claims, 10 Drawing Sheets

(56) References Cited

FOREIGN PATENT DOCUMENTS

| | | |
|---|---|---|
| JP | 2010212923 | 9/2010 |
| WO | WO 02/069076 A2 | 9/2002 |
| WO | WO 2011/031373 A2 | 3/2011 |

OTHER PUBLICATIONS

"Advanced TCA, PICMG 3.0 Short Form Specification", PICMG, PCI Industrial Computers, Jan. 2003, 33 pages.

Alexandra Dana Oltean, et al., "ATCA: Its Performance and Application for Real Time Systems", Real Time Conference, Jun. 4-10, 2005, 5 pages.

Partial translation of Office Action dated Feb. 4, 2013 in connection with Chinese Patent Application No. 201180000533.4.

English language International Search Report from the State Intellectual Property Office of P.R. China for International Application No. PCT/CN2011/074177 mailed Feb. 23, 2012.

* cited by examiner

METHOD, SERVICE BOARD, AND SYSTEM FOR TRANSMITTING KVM DATA

CROSS-REFERENCE TO RELATED APPLICATIONS

This application is a continuation of International Application No. PCT/CN2011/074177, filed on May 17, 2011, which is hereby incorporated by reference in its entirety.

FIELD OF THE INVENTION

The present invention relates to the field of communications technologies, and in particular, to a method, a service board, and a system for transmitting KVM data

BACKGROUND OF THE INVENTION

With the rapid development of Internet services and the continuous increasing of the number of Internet users, network traffic keeps rising continuously, and application and deployment of IT devices such as servers become more and more important. A server provides various services such as web access, file download, stream media for Internet users, and also provides a graphical user interface, a keyboard interface, and a mouse interface, which is convenient for network maintenance personnel to configure and maintain the device. Generally, human machine interfaces such as a keyboard, a video, and a mouse of the server are collectively called KVM (Keyboard, Video, Mouse, keyboard, video, mouse). Because the number of servers is large, it is impossible to connect the KVM to each server one by one during maintenance. Therefore, as shown in FIG. 1, a previous method is to connect one KVM to an external KVM switch device which is connected to multiple servers. Through this method, although remote management of the server is implemented, each server needs to provide cables of a keyboard, a mouse, and a video, which causes problems of increased costs and messy wiring. Moreover, because an analog switch manner is adopted, the cables of the keyboard, mouse, and video cannot be too long, and are generally tens of meters; otherwise, signal quality is affected, so only a local server can be managed, and a regional limit exists.

In order to solve the problems of messy wiring and regional limit, a KVM over IP (KVM over IP) technology is currently used. Through the technology, KVM data is converted into an IP packet, and transmitted through a network, thus effectively solving the foregoing problems. Specifically, as shown in FIG. 2, each server provides a KVM over IP module. The KVM over IP module may convert video output of a video card into an Ethernet packet and send the Ethernet packet to a console, or restore packaged keyboard and mouse information on a console into original data. The Ethernet packet including the KVM data may be transmitted in a network cable, so the number of transmission cables is reduced, thus solving the problem of messy wiring. Moreover, the server and a switch are connected through the network, and the switch and the console are also connected through the network, so the console and the server may be separated in different cities, thus solving the problem of regional limit.

ATCA (Advanced Telecom Computing Architecture, advanced telecom computing architecture) is a telecommunication level platform based on the PICMG standard, which takes requirements for performance and reliability in the telecommunication field into consideration. The ATCA architecture provides an independent management channel and a service channel. The management channel includes an IPMB (Intelligent Platform Management Bus, intelligent platform management bus) channel based on an IPMI (Intelligent Platform Management Interface, intelligent platform management interface) protocol and a BASE channel (management channel) based on an IP protocol. The service channel is a FABRIC channel (service channel) based on optional various protocols. As shown in FIG. 3, these channels have a dual-star structure. Each service board provides two IPMB interfaces, two BASE interfaces, and two FABRIC interfaces. The two IPMB interfaces are connected to two management boards. The two BASE interfaces and two FABRIC interfaces are connected to two switch boards.

An IPMB channel is used to transmit KVM information, specifically as shown in FIG. 4. A south bridge of a service board provides a PCI bus, which is connected to a display chip with a PCI interface. Video information output from the display chip is sent to an FPGA through a DVI interface. The FPGA compresses video data and sends the compressed video data to a BMC through an LPC interface. The BMC is a processor which is with low performance and dedicated to management. The BMC directly interfaces with an IPMB channel on a backplane, and may convert the compressed video data into an IMPI packet and send the IPMI packet to a management board. The management board converts the IPMI packet into an IP packet, and sends the IP packet to a switch board through a network port of a BASE channel. The switch board sends the IP packet to a remote console through a network port of its panel. Data amount of video information is large. For example, the data amount is 1.4 Gbps in the case of a resolution of 1024*768, a refresh rate of 75 Hz, and 24-bit true color. However, a maximum bandwidth of the IPMB channel is 400 Kbps, and when two IPMB channels are used simultaneously, only an 800 Kbps bandwidth is reached, which is far less than 1.4 Gbps. Therefore, the video data must be compressed substantially to satisfy the bandwidth requirement. However, the quality and refresh rate of a substantially-compressed video image must be affected greatly, thus causing the problem of image distortion. The BMC is further connected to the south bridge through two USB interfaces, and may simulate operations of a keyboard and a mouse. Due to the problem of the very low IPMB bandwidth, the compressed video data may be transmitted with difficulty, and the too large data amount causes a long delay of operating the keyboard and mouse by a user, and normal IPMI communication is affected.

In another implementation, four reserved pins on a Zone1 connector of an ATCA service board are customized as an FE channel (two for sending signals, and two for receiving signals). KVM data is transmitted through the FE channel. Specifically, as shown in FIG. 5, each service board has a KVM over IP module, which may convert the KVM data into an IP packet and transfer the IP packet to a management board through the FE channel. The ATCA specification does not limit an implementation manner (for example, signal definition, connector selection, or a slot location of a backplane interface) of the management board, so a switch chip may be provided on the management board to aggregate KVM over IP packets from all service boards, and then send the KVM over IP packets to a remote console through another network port of a panel. In this solution, the definition of the backplane interface is modified, and an original backplane and management board must be changed to be used with the service board, so compatibility is poor.

When the KVM information is transmitted through the IPMB channel, although the problem of poor compatibility does not exist, due to insufficient bandwidth of the data transmission channel, the problems of image distortion and delays of mouse and keyboard operations occur. When the KVM information is transmitted through the customized FE channel, although the bandwidth of the data transmission channel is not limited, because the FE channel is the channel customized through the four reserved pins on the Zone1 connector of the service board, it is required that the board and the backplane are customized, the compatibility is poor.

SUMMARY OF THE INVENTION

Embodiments of the present invention provide a method, a service board and a system for transmitting KVM data, which can not only provide a channel with a sufficient bandwidth for the KVM data, but also guarantee compatibility with an existing ATCA system.

In order to achieve the foregoing objectives, the embodiments of the present invention adopt the following technical solutions.

A method for transmitting keyboard, video, mouse (KVM) data includes:

converting, by the KVM data into a KVM packet; and sending the KVM packet to a switch board through a BASE channel, so that the switch board forwards the KVM packet to a remote console.

A service board includes:

a data conversion module, configured to convert keyboard, video, mouse (KVM) data into a KVM packet; and a sending module, configured to send the KVM packet obtained by the data conversion module to a switch board through a BASE channel, so that the switch board forwards the KVM packet to a remote console.

A system for transmitting keyboard, video, mouse (KVM) data includes a switch board and a service board, where the service board is configured to convert the KVM data into a KVM packet, and send the KVM packet to the switch board through a BASE channel, so that the switch board forwards the KVM packet to a remote console; and the switch board is configured to receive the KVM packet sent by the service board through the BASE channel, and send the KVM packet to the remote console.

In the method, the service board, and the system for transmitting KVM data provided by the embodiments of the present invention, the KVM data on the service board is converted into the KVM packet, and the KVM packet is transferred to the switch board through the BASE channel. The BASE channel has a 1000 Mbps bandwidth, and after being compressed properly, the KVM data only requires a 10 Mbps bandwidth, thus providing a channel with a sufficient bandwidth for the KVM data. Moreover, a switch chip is provided on the service board. A network port on the switch chip replaces an original BASE network port on the service board to form a new BASE channel, so a signal definition of a backplane interface does not need to be modified, thus guaranteeing the compatibility with an existing ATCA system.

BRIEF DESCRIPTION OF THE DRAWINGS

To illustrate the technical solutions according to the embodiments of the present invention or in the prior art more clearly, accompanying drawings required for describing the embodiments or the prior art are introduced in the following briefly. Apparently, the accompanying drawings in the following descriptions are merely some embodiments of the present invention, and persons of ordinary skill in the art may further obtain other drawings according to the accompanying drawings without creative efforts.

DETAILED DESCRIPTION OF THE EMBODIMENTS

The technical solutions of the embodiments of the present invention are clearly and completely described in the following with reference to the accompanying drawings in the embodiments of the present invention. Obviously, the embodiments to be described are only part of rather than all of the embodiments of the present invention. All other embodiments obtained by persons of ordinary skill in the art based on the embodiments of the present invention without creative efforts shall fall within the protection scope of the present invention.

Embodiment 1

An embodiment of the present invention provides a method for transmitting KVM data.

Figure 1:
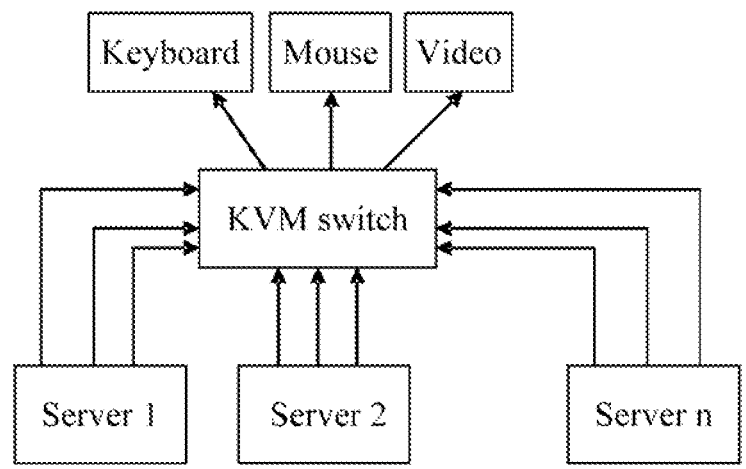
FIG. 1 is a diagram of a connection manner of an external KVM switch adopted in the prior art.
Figure 2:
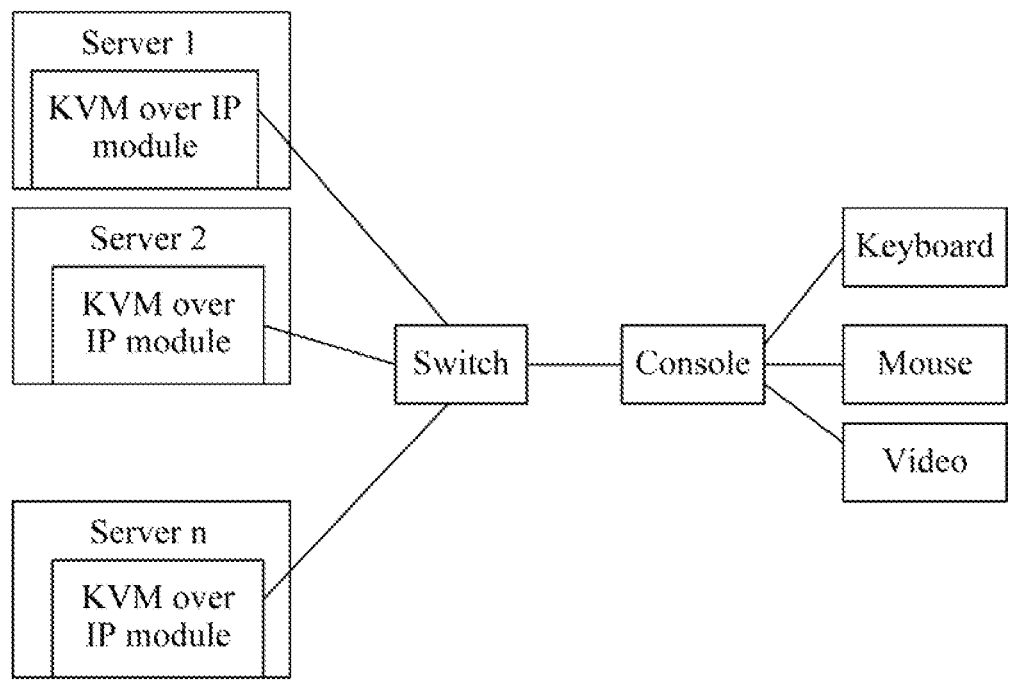
FIG. 2 is a diagram of a connection manner of a KVM over IP module adopted in the prior art.
Figure 3:
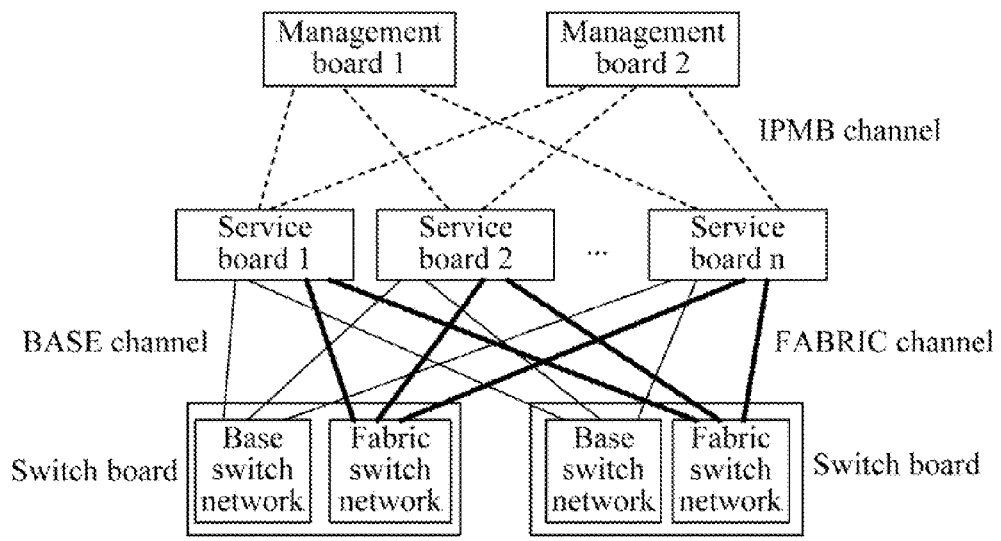
FIG. 3 is a schematic architecture diagram of an ATCA in the prior art.
Figure 4:
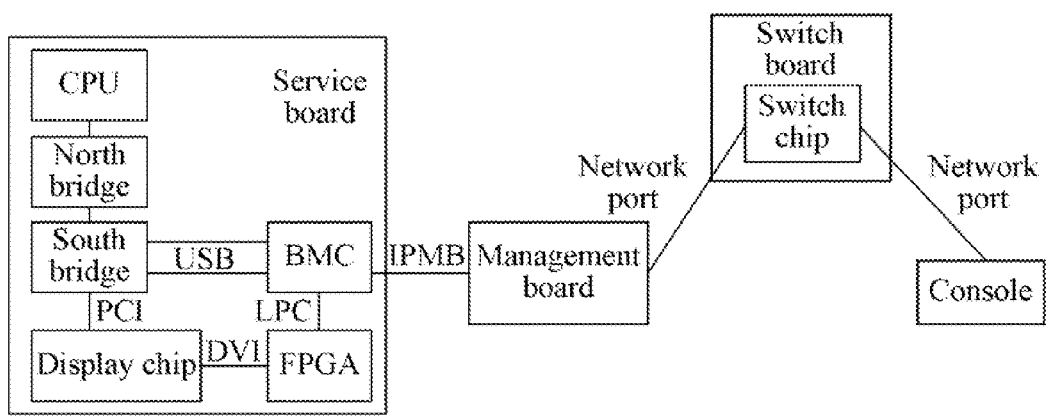
FIG. 4 is a connection diagram of a method for transmitting KVM data in the prior art.
Figure 5:
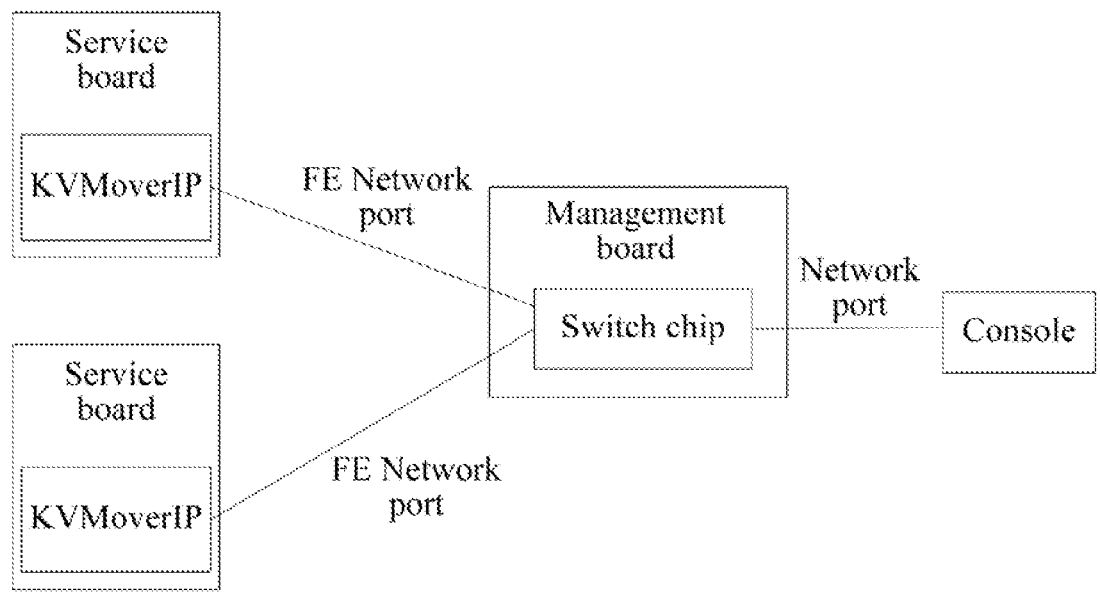
FIG. 5 is a connection diagram of a method for transmitting KVM data in the prior art.
Figure 6:
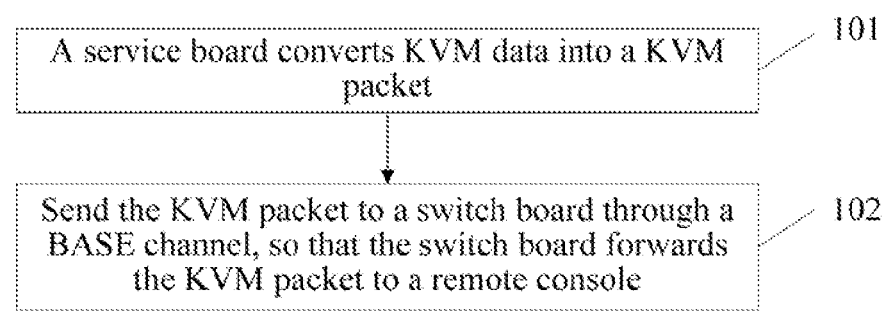
FIG. 6 is a flow chart of a method for transmitting KVM data according to a first embodiment of the present invention.

As shown in FIG. 6, the method includes:

101: A service board converts KVM data into a KVM packet.

The service board converts the KVM data into the KVM packet. The service board may convert the KVM data into the KVM packet through an internal KVM over IP chip of the service board, and may also convert the KVM data into the KVM packet through a discrete component, which is not limited in the embodiment of the present invention during specific implementation, and may be specifically selected according to user requirements.

102: Send the KVM packet to a switch board through a BASE channel, so that the switch board forwards the KVM packet to a remote console.

The BASE channel is an inherent channel on the service board, and is generally used in scenarios such as heartbeat detection between boards and data loading during software upgrade only in an ATCA system. Most of the time, data amount is very small, and a bandwidth of 1000 Mbps is not fully used. Therefore, transmission of the KVM data through the BASE channel may guarantee a sufficient bandwidth.

In the embodiment of the present invention, the KVM packet is transmitted through the BASE channel on the service board. The BASE channel has a 1000 Mbps bandwidth, and after being compressed properly, the KVM data only needs a 10 Mbps bandwidth, thus providing a channel with a sufficient bandwidth for the KVM data. Moreover, a BASE network port does not change a definition of an original interface, so a signal definition of a backplane interface does not need to be modified, thus guaranteeing compatibility with an existing ATCA system.

Embodiment 2

Figure 7:
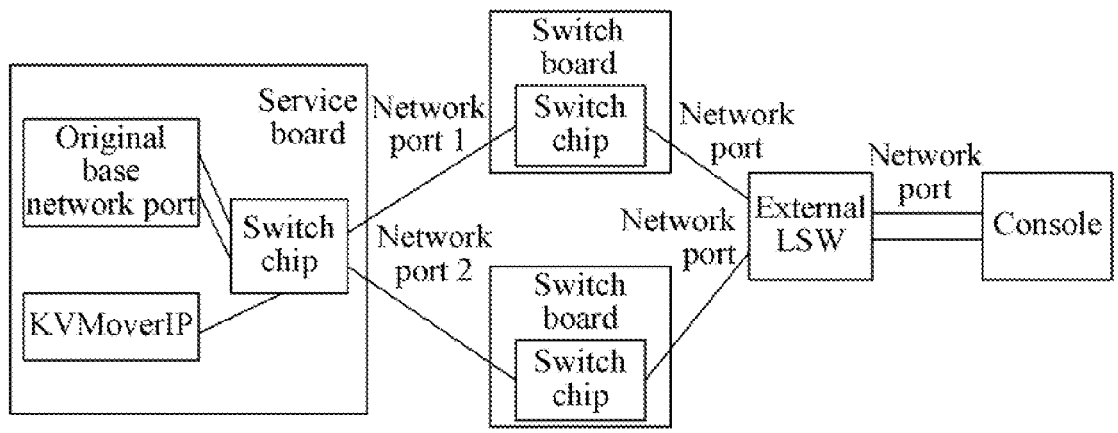
FIG. 7 is a connection diagram of a method for transmitting KVM data according to a second embodiment of the present invention.

An embodiment of the present invention provides a method for transmitting KVM data. In the embodiment of the present invention, a case in which a switch chip provides two BASE network ports for output from a backplane is taken as an example to specifically describe the method for transmitting KVM data As shown in FIG. 7, an ATCA service board provides a GE switch chip only needing to complete a layer-2 function, and the switch chip has at least five ports. Two original BASE channel network ports on the service board are connected to two ports of the switch chip, an output of a KVM over IP chip is also connected to a port of the switch chip, and the switch chip provides other two ports output from the backplane as a BASE channel (network port 1 and network port 2) of the service board. The two network ports on the switch chip are connected to switch chips on two switch boards respectively. The switch chip on the switch board and the switch chip on the service board are of different types, because the required numbers of ports are different.

The switch chip may be automatically configured after power-on reset, and a processor on the service board does not need to intervene. In this way, during a startup process of the service board, a console may still monitor the switch chip. The automatic configuration function is implemented through a non-volatile memory connected to the switch chip. Configuration data of the chip is burnt in advance in the non-volatile memory, and is automatically loaded into the switch chip after power-on reset of the service board. A KVM over IP module in the service board may be a dedicated KVM over IP integrated chip, and may also be formed by a discrete component. A processor is usually integrated in the KVM over IP chip. The configuration may be automatically completed after the power-on reset of the service board, and the processor on the board does not need to intervene. In this way, the GE switch chip and the KVM over IP chip are completely independent from the service board, and can still work when the service board fails, thus facilitating continuous monitoring and fault locating of the service board.

Figure 8:
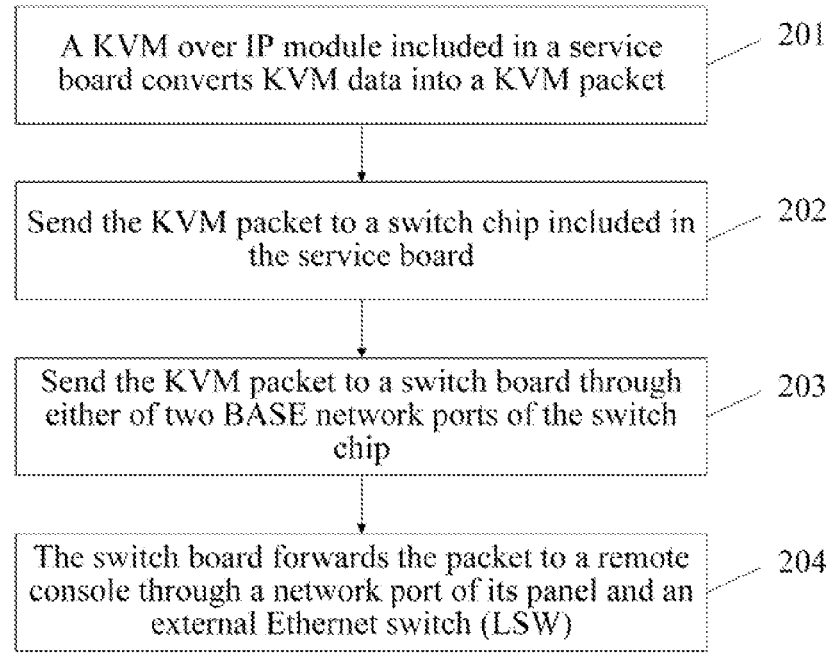
FIG. 8 is a flow chart of the method for transmitting KVM data according to the second embodiment of the present invention.

When only a KVM service exists, as shown in FIG. 8, the method for transmitting KVM data includes:

201: A KVM over IP module included in a service board i.e. A KVM over IP module included in a service board converts KVM data into a KVM packet.

202: Send the KVM packet to a switch chip included in a service board i.e. an internal switch chip of the service board.

203: Send the KVM packet to a switch board through either of two BASE network ports of the switch chip.

204: The switch board forwards the packet to a remote console through a network port of its panel and an external Ethernet switch (LSW).

Figure 9:
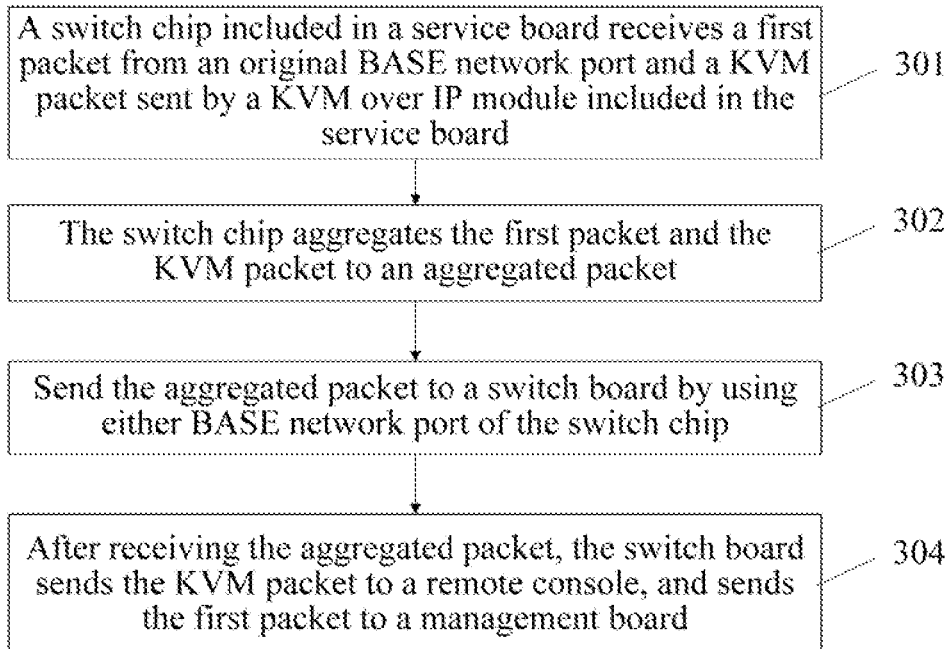
FIG. 9 is a flow chart of a method for transmitting KVM data and a first packet according to the second embodiment of the present invention.

When a KVM service and a first packet service of an original BASE network port of the service board exist. as shown in FIG. 9, the method for transmitting KVM data includes:

301: An internal switch chip of a service board receives a first packet from an original BASE network port and a KVM packet sent by an internal KVM over IP module of the service board.

302: The switch chip aggregates the first packet and the KVM packet to an aggregated packet.

303: Send the aggregated packet to a switch board through either BASE network port of the switch chip.

304: After receiving the aggregated packet, the switch board sends the KVM packet to a remote console, and sends the first packet to a management board.

The switch board is also connected to the management board, which is not shown in FIG. 7. Data from the BASE channel of the service board includes the first packet of the original BASE network port and the new KVM packet, which are forwarded to different locations through preset destination MAC addresses on the switch board. For example, management information is forwarded to the management board, and the KVM information is forwarded to the console.

FIG. 7 shows an embodiment of one ATCA plug-in frame. Each plug-in frame provides two network ports to be connected to the LSW. The number of connecting lines is greatly reduced. For a plurality of ATCA plug-in frames, the situation is similar. To guarantee the reliability, two LSWs are generally used. Outgoing network ports of the two switch boards are connected to the two LSWs respectively, and the console also has two network ports connected to the two LSWs. In this way, it can be avoided that the entire link is disconnected due to a failure on a single LSW.

Furthermore, if the KVM over IP module on the service board starts to work immediately after power-on reset, the KVM over IP module converts the KVM data into the IP packet and sends the IP packet to the console. Executing this type of operation on a lot of service boards inevitably leads to network congestion. Because the number of service boards that can be monitored by the console simultaneously is limited, those service boards that are not monitored do not need to perform a KVM over IP operation to increase ineffective network loads and energy consumption. Therefore, KVM over IP modules of these service boards may be turned off, so that the KVM over IP modules are in an idle or a sleep state. A specific method may be to set the KVM over IP modules to a reset state and instruct the modules to enter the idle or sleep state, for example, turn off a clock or a power source of an internal unit. When a KVM over IP function needs to be started, the BMC may provide a wakeup interrupt signal or a customized level signal. The methods belong to the prior art, and will not be repeatedly described here.

Figure 10:
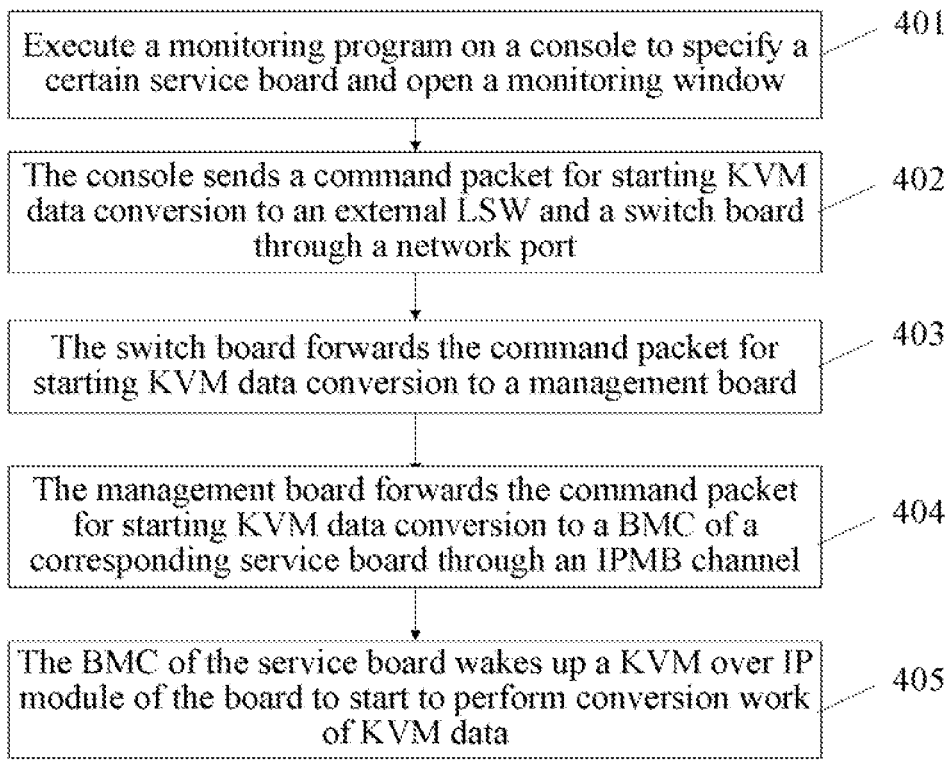
FIG. 10 is a flow chart about starting a KVMoverIP module through an IPMB channel according to the second embodiment of the present invention.

Therefore, the KVM over IP module does not work in a default state, and keeps an idle or a sleep state. The KVM over IP module is started according to the following process. As shown in FIG. 10, the process includes:

401: Execute a monitoring program on a console to specify a certain service board and open a monitoring window

402: The console delivers a command packet for starting KVM data conversion to an external LSW and a switch board through a network port.

403: The switch board forwards the command packet for starting KVM data conversion to a management board.

404: The management board forwards the command packet for starting KVM data conversion to a BMC of a corresponding service board through an IPMB channel.

405: The BMC of the service board wakes up a KVM over IP module of the board to start to perform conversion work of KVM data.

Figure 11:
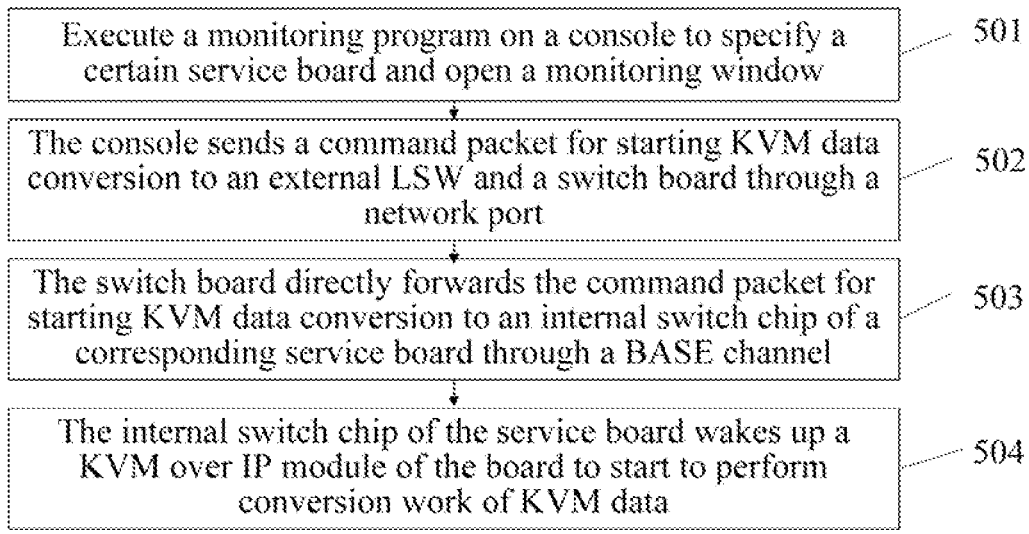
FIG. 11 is a flow chart about starting the KVMoverIP module through a BASE channel according to the second embodiment of the present invention.

When sending the command packet for starting KVM data conversion to the service board, the console may send the command packet for starting KVM data conversion to the service board through the management board or directly through a BASE channel on a backplane of the service board. As shown in FIG. 11, a method for sending the command packet for starting KVM data conversion is specifically as follows:

501: Execute a monitoring program on a console to specify a certain service board and open a monitoring window.

502: The console delivers a command packet for starting KVM data conversion to an external LSW and a switch board through a network port.

503: The switch board directly forwards the command packet for starting KVM data conversion to an internal switch chip of a corresponding service board through a BASE channel.

504: The internal switch chip of the service board wakes up a KVM over IP module of the board to start to perform conversion work of KVM data.

Figure 12:
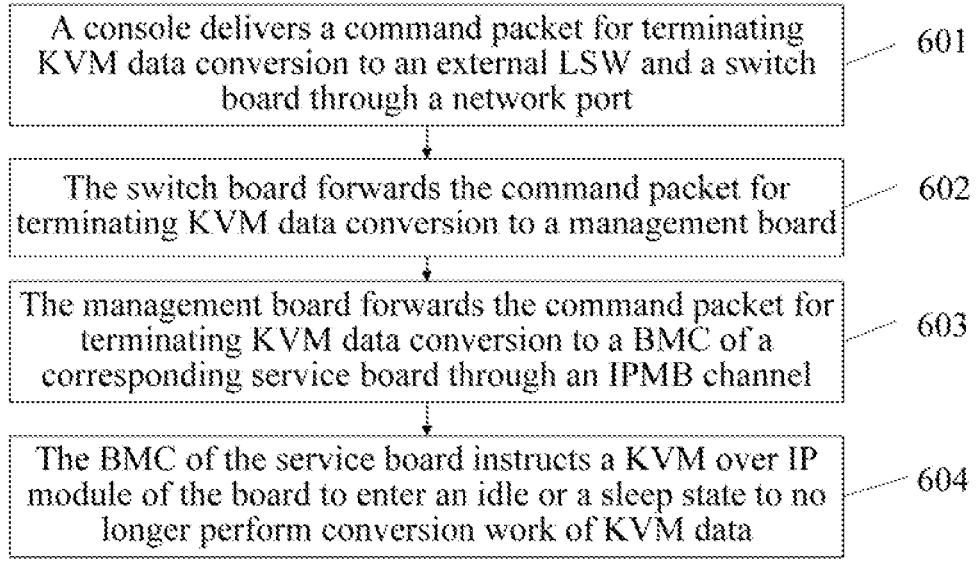
FIG. 12 is a flow chart about turning off the KVMoverIP module through the IPMB channel according to the second embodiment of the present invention.

If a user closes the monitoring window of the certain service board, the KVM over IP module is enabled to sleep according to the following process. As shown in FIG. 12, the process includes:

601: A console delivers a command packet for terminating KVM data conversion to an external LSW and a switch board through a network port.

602: The switch board forwards the command packet for terminating KVM data conversion to a management board.

603: The management board forwards the command packet for terminating KVM data conversion to a BMC of a corresponding service board through an IPMB channel.

604: The BMC of the service board instructs a KVM over IP module of the board to enter an idle or a sleep state to no longer perform conversion work of KVM data.

Figure 13:
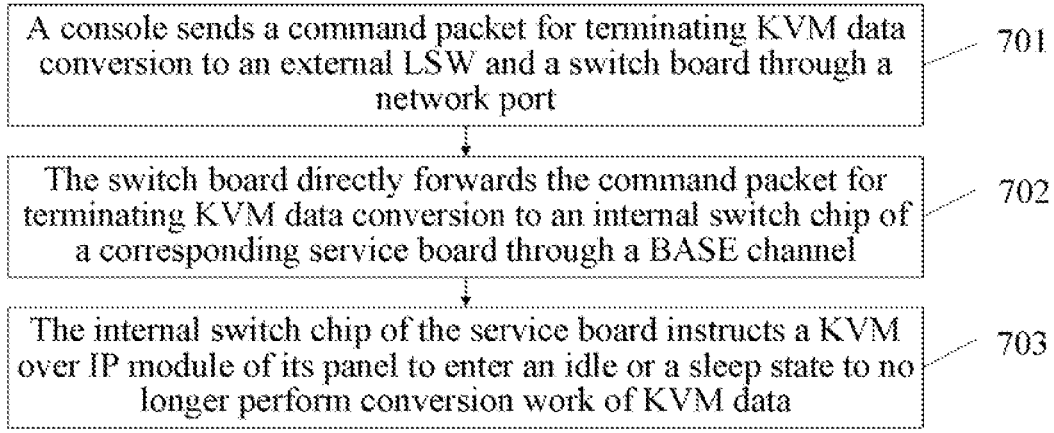
FIG. 13 is a flow chart about turning off the KVMoverIP module through the BASE channel according to the second embodiment of the present invention.

When sending the command packet for terminating KVM data conversion to the service board, the console may send the command packet for terminating KVM data conversion to the service board through the management board or directly through a BASE channel on a backplane of the service board. As shown in FIG. 13, a method for sending the command packet for terminating KVM data conversion is specifically as follows:

701: A console delivers a command packet for terminating KVM data conversion to an external LSW and a switch board through a network port.

702: The switch board directly forwards the command packet for terminating KVM data conversion to an internal switch chip of a corresponding service board through a BASE channel.

703: The internal switch chip of the service board instructs a KVM over IP module of the board to enter an idle or a sleep state to no longer perform conversion work of KVM data In the embodiment of the present invention, the KVM packet is transmitted through the BASE channel on the service board. The BASE channel has a 1000 Mbps bandwidth, and after being compressed properly, the KVM data only needs a 10 Mbps bandwidth, thus providing a channel with a sufficient bandwidth for the KVM data. Moreover, the BASE network port does not change a definition of an original interface, so a signal definition of a backplane interface does not need to be modified, thus guaranteeing compatibility with an existing ATCA system.

Moreover, in the embodiment of the present invention, the two BASE network ports of the switch chip can work separately, and when one switch board or network port fails, the KVM data is still available, so the reliability is high.

Furthermore, the console may select a service board to be monitored according to requirements, and remotely control the KVM over IP module on the service board to be started or sleep, thus reducing power consumption and inefficient network loads.

Embodiment 3

Figure 14:
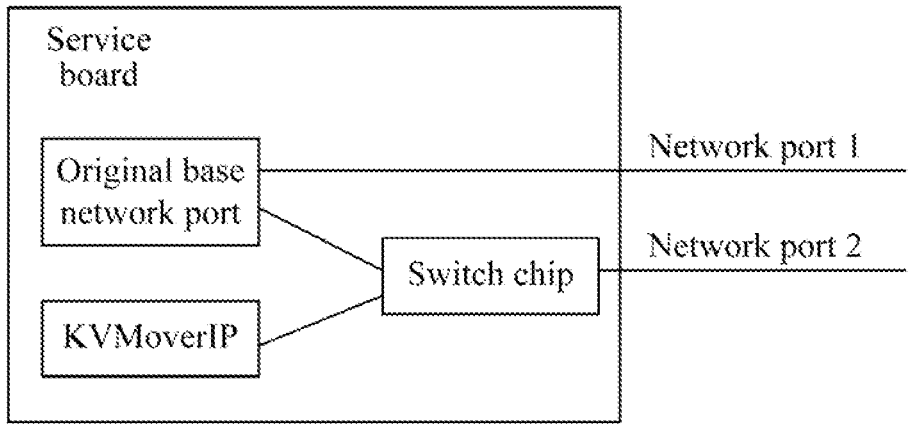
FIG. 14 is a connection diagram of a method for transmitting KVM data according to a third embodiment of the present invention.

An embodiment of the present invention provides a method for transmitting KVM data. In some cost-sensitive scenarios with low KVM reliability requirements, a switch chip with a smaller number of ports, for example, three ports, may be used. Specifically, as shown in FIG. 14, one original BASE network port on a service board is directly connected to a switch board, another BASE network port and a network port of a KVM over IP module are both connected to a switch chip of the board, and the switch chip further provides a network port to be connected to another switch board. In the configuration situation, when the switch board connected to a network port 2 fails, a KVM link from a remote console to the entire frame is interrupted, but management data of a BASE channel is not affected, because the management data may also be transferred through a network port 1.

Figure 15:
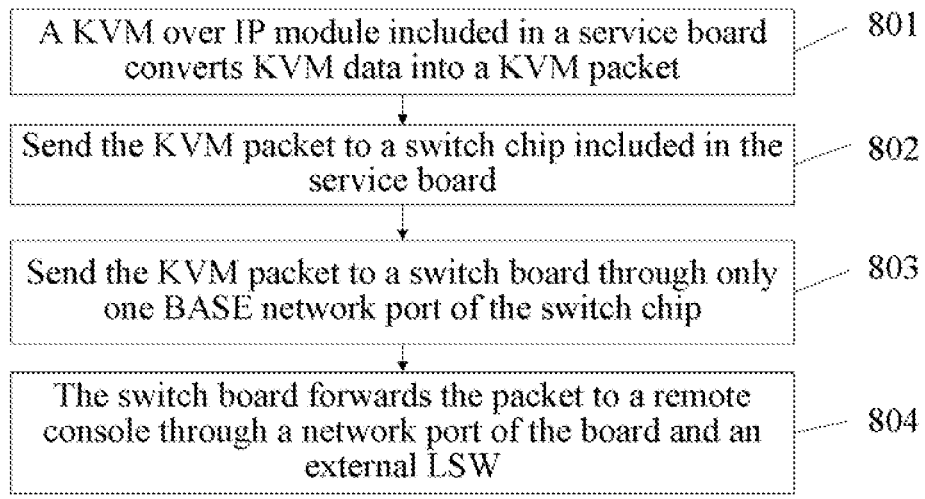
FIG. 15 is a flow chart of the method for transmitting KVM data according to the third embodiment of the present invention.

When only a KVM service exists, as shown in FIG. 15, the method for transmitting KVM data includes:

801: A KVM over IP module included in a service board converts KVM data into a KVM packet.

802: Send the KVM packet to a switch chip included in a service board.

803: Send the KVM packet to a switch board through the only one BASE network port of the switch chip.

804: The switch board forwards the packet to a remote console through a network port of its panel and an external LSW.

Figure 16:
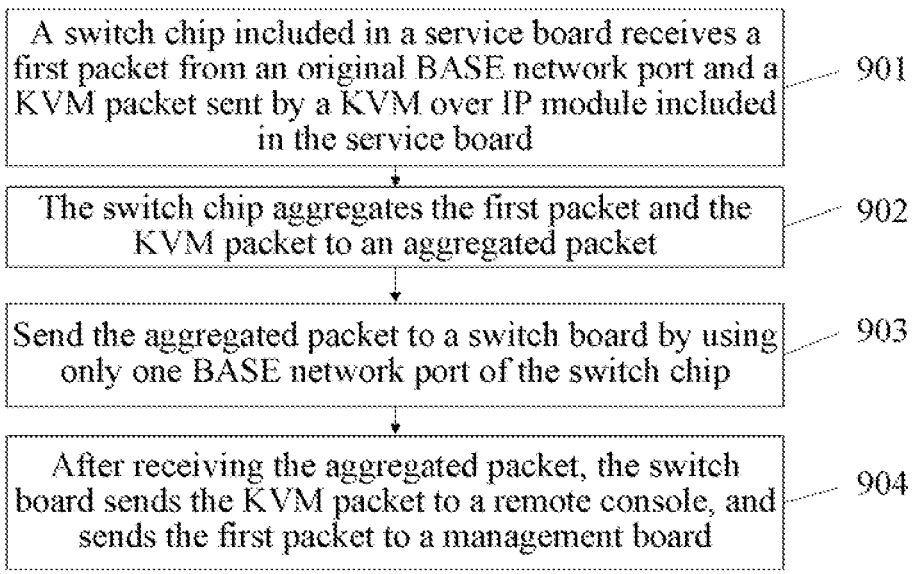
FIG. 16 is a flow chart of a method for transmitting KVM data and a first packet through a switch chip according to the third embodiment of the present invention.

When both a KVM service and a first packet service of an original BASE network port of the service board exist, and the first packet is transmitted through the only one BASE network port of the switch chip, as shown in FIG. 16, the method for transmitting KVM data includes:

901: An internal switch chip of a service board receives a first packet from an original BASE network port and a KVM packet sent by an internal KVM over IP module of the service board.

902: The switch chip aggregates the first packet and the KVM packet to an aggregated packet.

903: Send the aggregated packet to a switch board through the only one BASE network port of the switch chip.

904: After receiving the aggregated packet, the switch board sends the KVM packet to a remote console, and sends the first packet to a management board.

The switch board is also connected to the management board, which is not shown in FIG. 14. Data from the BASE channel of the service board includes the first packet of the original BASE network port and the new KVM packet, which are forwarded to different locations through preset destination MAC addresses on the switch board. For example, management information is forwarded to the management board, and the KVM information is forwarded to the console.

When the first packet service of the original BASE network port of the service board is transmitted through the network port 1, reference may be made to corresponding description in the prior art for a specific transmission method, which is will not repeatedly described here.

The KVM over IP module does not work in a default state, and keeps an idle or a sleep state. The method for starting the KVM over IP module is the same as those in FIG. 10 and FIG. 11 in the second embodiment, and the method for turning off the KVM over IP module is the same as those in FIG. 12 and FIG. 13 in the second embodiment, which are not repeatedly described in the embodiment of the present invention.

In the embodiment of the present invention, the KVM packet is transmitted through the BASE channel on the service board. The BASE channel has a 1000 Mbps bandwidth, and after being compressed properly, the KVM data only needs a 10 Mbps bandwidth, thus providing a channel with a sufficient bandwidth for the KVM data. Moreover, the BASE network port does not change a definition of an original interface, so a signal definition of a backplane interface does not need to be modified, thus guaranteeing compatibility with an existing ATCA system.

Moreover, the internal switch chip on the switch board only needs to be connected to the KVM over IP module and one network port of the original BASE network ports, and only one network port is provided to be connected to the switch board, so the number of interfaces of the switch chip is small, thus saving the cost. Moreover, one original BASE network port is reserved, so even when a BASE network port where the KVM data is located fails, management data communication is not affected.

Furthermore, the console may select a service board to be monitored according to requirements, and remotely control the KVM over IP module on the service board to be started or sleep, thus reducing power consumption and inefficient network loads.

Embodiment 4

Figure 17:
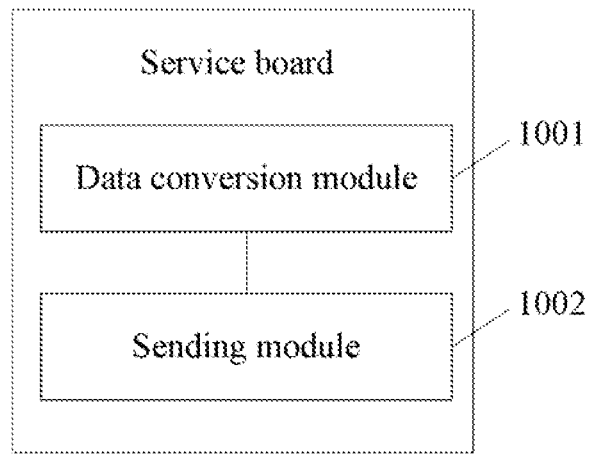
FIG. 17 is a schematic diagram of basic components of a service board according to a fourth embodiment of the present invention.

An embodiment of the present invention provides a service board. As shown in FIG. 17, the service board includes a data conversion module 1001 and a sending module 1002.

The service board provides two IPMB interfaces, two BASE interfaces, and two FABRIC interfaces. The two IPMB interfaces are connected to two management boards. The two BASE interfaces and two FABRIC interfaces are connected to two switch boards respectively. A BASE channel must adopt 10/100/1000 BASE-T, and a bandwidth is 10/100/1000 Mbps adaptive. For an FABRIC channel, multiple options exist. The FABRIC channel may be, such as, GE, 10GE, PCI Express, and InfiniBand. In addition, ATCA architecture further defines an update channel and a synchronous clock, which are used for data backup between two boards or supporting TDM services.

A backplane interface of an ATCA board is divided into three zones from bottom to top: Zone1, Zone2, and Zone3. The Zone1 zone includes a connector, which is used for transferring −48 V power source, an IPMB channel, and a slot number of a board. The Zone2 zone includes 1 to 5 connectors, which are used for connecting the BASE channel, the FABRIC channel, and the update channel, and synchronizing clock information, where generally, the service board has two connectors and the switch board has five connectors. The Zone3 zone is used for communicating with a rear board, for example, providing an external service interface, and a customized connector may be used. The types of the connectors in the Zone1 and Zone2 are defined in the ATCA specification and cannot be changed.

The data conversion module 1001 is configured to convert KVM data into a KVM packet. The data conversion module 1001 is an internal KVM over IP chip of the service board or a discrete component.

The sending module 1002 is configured to send the KVM packet obtained by the data conversion module 1001 to a switch board through a BASE channel, so that the switch board forwards the KVM packet to a remote console.

Figure 18:
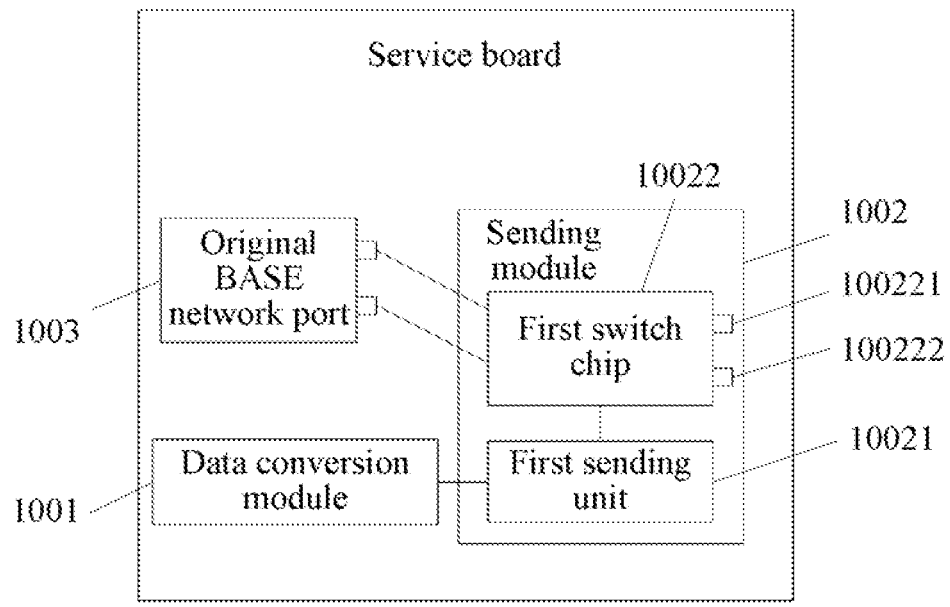
FIG. 18 is a schematic diagram of components of a service board when an internal switch chip provides two network ports according to the fourth embodiment of the present invention.

Furthermore, as shown in FIG. 18, the sending module 1002 includes a first sending unit 10021 and a first switch chip 10022. The first switch chip includes two BASE network ports (a network port 100221 and a network port 100222).

The first sending unit 10021 is configured to send the KVM packet obtained by the data conversion module 1001 to the first switch chip 10022.

The first switch chip 10022 is configured to send the KVM packet to the switch board through either of the two BASE network ports (the network port 100221 and the network port 100222).

Meanwhile, as shown in FIG. 18, the service board further includes two original BASE network ports 1003 of the service board. The two original BASE network ports 1003 of the service board are both connected to the first switch chip 10022.

The first switch chip 10022 is further configured to receive a first packet from the original BASE network port 1003 of the service board, aggregate the first packet and the KVM packet, and send the aggregated packet to the switch board by using either of the two BASE network ports included in the first switch chip 10022, so that the switch board sends the KVM packet to the remote console, and sends the first packet to the management board.

Figure 19:
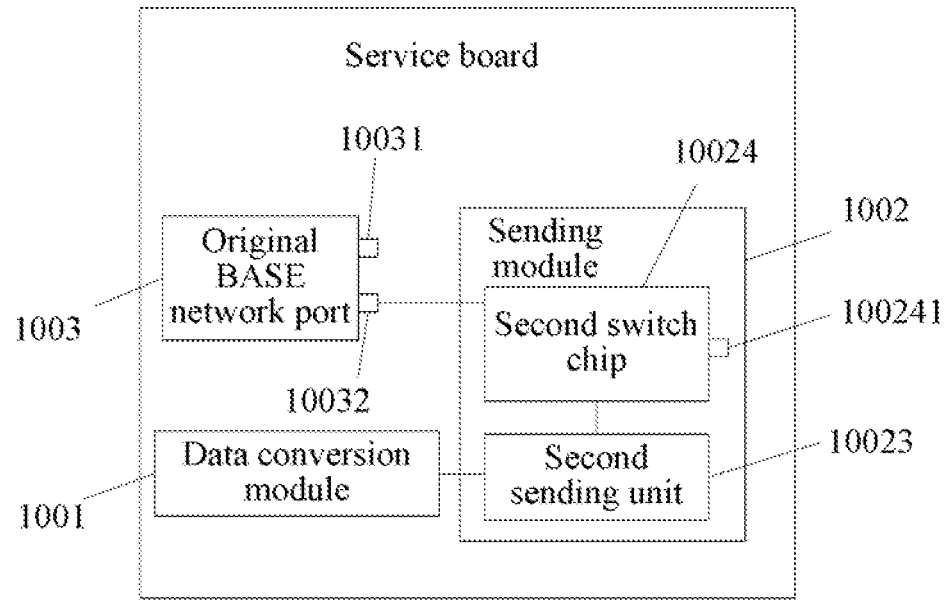
FIG. 19 is a schematic diagram of components of a service board when an internal switch chip only provides one network port according to the fourth embodiment of the present invention.

Furthermore, as shown in FIG. 19, the sending module 1002 includes a second sending unit 10023 and a second switch chip 10024. The second switch chip 10024 includes only one BASE network port 100241.

The second sending unit 10023 is configured to send the KVM packet obtained by the data conversion module 1001 to the second switch chip 10024.

The second switch chip 10024 sends the KVM packet to the switch board through the only one BASE network port 100241.

Meanwhile, as shown in FIG. 19. the service board further includes two original BASE network ports 1003 of the service board. One network port 10032 of the two original BASE network ports 1003 (a network port 10031 and a network port 10032) of the service board is connected to the second switch chip 10024, and the other network port 10031 keeps an original connection manner.

The second switch chip 10024 is further configured to receive a first packet from the original BASE network port 10032 of the service board, aggregate the first packet and the KVM packet, and send the aggregated packet to the switch board through the only one BASE network port 100241 included in the second switch chip 10024, so that the switch board sends the KVM packet to the remote console, and sends the first packet to the management board.

Figure 20:
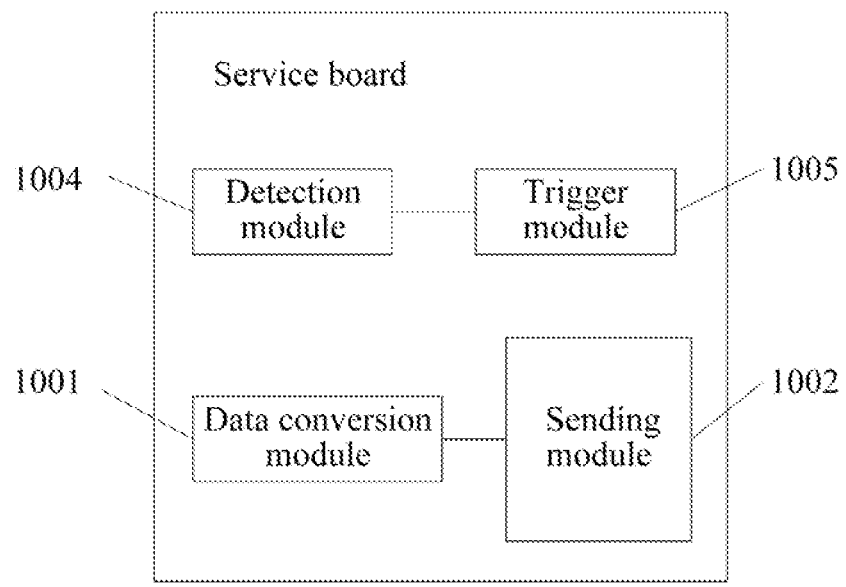
FIG. 20 is a schematic diagram of components of a service board when a detection module and a trigger module are included according to the fourth embodiment of the present invention.

Furthermore, as shown in FIG. 20, the service board further includes a detection module 1004 and a trigger module 1005.

The detection module 1004 is configured to, before the data conversion module 1001 converts the KVM data into the KVM packet, detect whether a command packet for starting KVM data conversion, where the command packet for starting KVM data conversion is sent by the remote console, is received, and is further configured to detect whether a command packet for terminating KVM data conversion, where the command packet for terminating KVM data conversion is sent by the remote console, is received.

The trigger module 1005 is configured to: when the detection module 1004 detects that the command packet for starting KVM data conversion is received, activate the data conversion module 1001 to convert the KVM data into the KVM packet, and is further configured to: when the detection module 1004 detects that the command packet for terminating KVM data conversion is received, trigger the data conversion module 1001 to terminate the conversion of the KVM data into the KVM packet.

It should be noted that, for other description of functional modules included in the service board according to the embodiment of the present invention, reference may be made to the description of the corresponding parts in the first embodiment to the third embodiment, and details are not repeatedly described here in the embodiment of the present invention.

Figure 21:
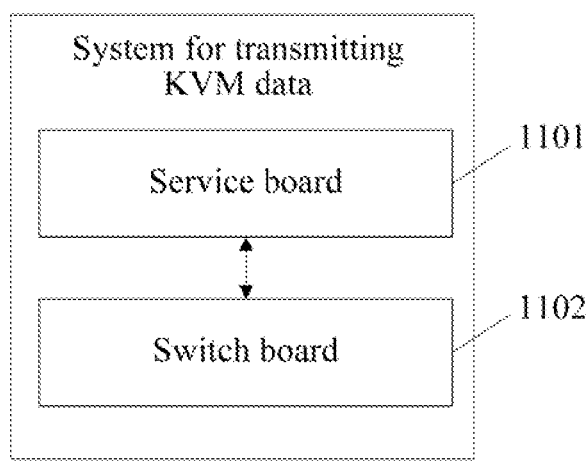
FIG. 21 is a schematic diagram of components of a system for transmitting KVM data according to the fourth embodiment of the present invention.

An embodiment of the present invention further provides a system for transmitting KVM data. As shown in FIG. 21, the system includes a service board 1101 and a switch board 1102.

The service board 1101 is configured to convert keyboard, video, mouse (KVM) data into a KVM packet, and send the KVM packet to the switch board 1102 through a BASE channel, so that the switch board forwards the KVM packet to a remote console.

The switch board 1102 is configured to receive the KVM packet sent by the service board 1001 through the BASE channel, and send the KVM packet to the remote console.

It should be noted that, for other description of functional modules included in the system according to the embodiment of the present invention, reference may be made to description of corresponding apparatus parts in the first embodiment to the third embodiment and the fourth embodiment, and details are not repeatedly described here in the embodiment of the present invention.

In the embodiment of the present invention, the KVM packet is transmitted through the BASE channel on the service board. The BASE channel has a 1000 Mbps bandwidth, and after being compressed properly, the KVM data only needs a 10 Mbps bandwidth, thus providing a channel with a sufficient bandwidth for the KVM data Moreover, a BASE network port does not change a definition of an original interface, so a signal definition of a backplane interface does not need to be modified, thus guaranteeing compatibility with an existing ATCA system.

Furthermore, the console may select a service board to be monitored according to requirements, and remotely control the KVM over IP module on the service board to be started or sleep, thus reducing power consumption and inefficient network loads.

Through the foregoing description of the embodiments, persons skilled in the art may clearly understand that the present invention may be implemented by software plus necessary universal hardware, and definitely may also be implemented by hardware, but in most cases, the former is a preferred implementation manner. Based on such understanding, the technical solutions of the present invention or the part that makes contributions to the prior art can be substantially embodied in the form of a software product. The computer software product may be stored in a readable storage medium such as a floppy disk of a computer, a hard disk or an optical disk, and contain several instructions to instruct a computer device (for example, a personal computer, a server, or a network device) to perform the method described in the embodiments of the present invention.

The foregoing description is only the specific implementation of the present invention, but is not intended to limit the protection scope of the present invention. Any change or replacement that can be easily thought of by persons skilled in the art within the technical scope disclosed by the present invention shall fall within the protection scope of the present invention. Therefore, the protection scope of the present invention shall be subject to the protection scope of the claims.

What is claimed is:

1. A method for transmitting keyboard, video, mouse (KVM) data, comprising:
   converting, by a service board, the KVM data into a KVM packet;
   sending, by the service board, the KVM packet to a switch board through a BASE channel, so that the switch board forwards the KVM packet to a remote console;
   wherein the service board comprises:
   a data conversion module for converting the KVM data into the KVM packet,
   at least one original BASE network port of an Advanced Telecommunications Computing Architecture (ATCA) system, and
   a switch chip comprising one or two BASE network ports, the switch chip further coupled to the at least one original BASE network port and coupled to the data conversion module for receiving the KVM packet; and
   wherein sending, by the service board, the KVM packet to the switch board through the BASE channel comprises:
   if the switch chip comprises two BASE network ports, sending, by the switch chip,
   the KVM packet to the switch board through either of the two BASE network ports of the switch chip, or if the switch chip comprises one BASE network port, sending, by the switch chip, the KVM packet to the switch board through the one BASE network port of the switch chip.

2. The method according to claim 1, wherein the service board further comprises two original BASE network ports coupled to the switch chip, and the switch chip comprises two BASE network ports; and the method further comprises:
   receiving, by the switch chip, a first packet from one of the original BASE network ports, and aggregating, by the switch chip, the first packet and the KVM packet into an aggregated packet; and sending, by the switch chip, the aggregated packet to the switch board through either of the two BASE network ports so that the switch board sends the KVM packet to the remote console and sends the first packet to a management board.

3. The method according to claim 1, wherein the service board further comprises two original BASE network ports, one of the two original BASE network ports coupled to the switch chip; and the method further comprises:
  receiving, by the switch chip, a first packet from the original BASE network port coupled to the switch chip, and aggregating, by the switch chip, the first packet and the KVM packet into an aggregated packet; and
  sending, by the switch chip, the aggregated packet to the switch board through one BASE network port of the switch chip, so that the switch board sends the KVM packet to the remote console and sends the first packet to a management board.

4. The method according to claim 1, wherein if a first packet is transmitted through the at least one original BASE network port of the service board, the method further comprises:
  sending, by the switch chip, the first packet from the at least one original BASE network port of the service board to a management board through at least one of the one or two BASE network ports of the switch chip.

5. The method according to claim 1, wherein before converting, by the service board, the KVM data into the KVM packet, the method further comprises:
  detecting whether a command packet for starting KVM data conversion is received from the remote console; and
  when detecting that the command packet for starting KVM data conversion is received, converting the KVM data into the KVM packet.

6. The method according to claim 5, wherein converting the KVM data into the KVM packet comprises:
  converting, by a KVM over IP chip or a discrete component, the KVM data into the KVM packet.

7. The method according to claim 5, wherein
  the command packet for starting KVM data conversion passes through the switch board, and via the BASE channel to a service board; or
  the command packet for starting KVM data conversion passes through a management board, and via an IPMB channel to a service board.

8. The method according to claim 1, further comprising:
  detecting whether a command packet for terminating KVM data conversion is received from the remote console; and
  when detecting that the command packet for terminating KVM data conversion is received, terminating the conversion of the KVM data into the KVM packet.

9. A service board, comprising:
  at least one original BASE network port of an Advanced Telecommunications Computing Architecture (ATCA) system;
  a switch chip comprising one or two BASE network ports, the switch chip further coupled to the at least one original BASE network port;
  a data conversion module, in the form of a keyboard, video, mouse (KVM) over IP chip or a discrete component, coupled to the switch chip and configured to convert KVM data into a KVM packet and send the KVM packet to the switch chip; and
  wherein the service board is configured to send the KVM packet to a switch board through a BASE channel by:
    if the switch chip comprises two BASE network ports, sending, by the switch chip,
    the KVM packet to the switch board through either of the two BASE network ports of the switch chip, or if the switch chip comprises one BASE network port, sending, by the switch chip, the KVM packet to the switch board through the one BASE network port of the switch chip.

10. The service board according to claim 9, further comprising two original BASE network ports of the service board, wherein the two original BASE network ports of the service board are both connected to the switch chip and the switch chip comprises two BASE network ports; and
  the switch chip is further configured to receive a first packet from one of the two original BASE network ports of the service board, aggregate the first packet and the KVM packet to an aggregated packet, and send the aggregated packet to the switch board through either of the two BASE network ports comprised in the switch chip, so that the switch board sends the KVM packet to the remote console and sends the first packet to a management board.

11. The service board according to claim 9, further comprising two original BASE network ports of the service board, wherein one of the two original BASE network ports of the service board is connected to the switch chip and the switch chip comprises one BASE network port; and
  when a first packet from the one of the two original BASE network ports of the service board is sent to the switch chip, the switch chip is further configured to receive the first packet, aggregate the first packet and the KVM packet to an aggregated packet, and send the aggregated packet to the switch board through the one BASE network port comprised in the switch chip, so that the switch board sends the KVM packet to the remote console and sends the first packet to a management board.

12. The service board according to claim 9, further comprising:
  a detection module, configured to detect whether a command packet for starting KVM data conversion is received from a remote console; and
  a trigger module, configured to: when the detection module detects that the command packet for starting KVM data conversion is received, activate the data conversion module to convert the KVM data into the KVM packet.

13. The service board according to claim 12, wherein
  the detection module is further configured to detect whether a command packet for terminating KVM data conversion is received from the remote console; and
  the trigger module is further configured to: when the detection module detects that the command packet for terminating KVM data conversion is received, trigger the data conversion module to terminate the conversion of the KVM data into the KVM packet.

14. A system for transmitting keyboard, video, mouse (KVM) data, the system comprising:
  a switch board;
  a service board, comprising,
    at least one original BASE network port of an Advanced Telecommunications Computing Architecture (ATCA) system,
    a switch chip comprising at least one two BASE network ports, the switch chip further coupled to the at least one original BASE network port, and
    a data conversion module, comprising a KVM over IP chip, coupled to the switch chip, wherein the KVM over IP chip is configured to convert KVM data into a KVM packet and send the KVM packet to the switch chip;

wherein the service board is configured to send the KVM packet to the switch board through a BASE channel;

the switch chip is configured to send the KVM packet to the switch board through either of the two BASE network ports; and the switch board is configured to receive the KVM packet and send the KVM packet to a remote console.

15. The system according to claim 14, wherein:

the service board further comprises two original BASE network ports coupled to the switch chip;

the switch chip is further configured to receive a first packet from the one of the two original BASE network ports, aggregate the first packet and the KVM packet to an aggregated packet; and send the aggregated packet to the switch board through either of the two BASE network ports comprised in the switch chip; and the switch board is further configured to send the KVM packet to the remote console and to send the first packet to a management board.

* * * * *